United States Patent Office 2,758,987
Patented Aug. 14, 1956

2,758,987
OPTICALLY ACTIVE HOMOPOLYMERS CONTAINING BUT ONE ANTIPODAL SPECIES OF AN ALPHA - MONOHYDROXY MONOCARBOXYLIC ACID

Paul L. Salzberg, Wilmington, Del., assignor to E. I. du Pont de Nemours and Company, Wilmington, Del., a corporation of Delaware No Drawing. Application June 5, 1952,
Serial No. 291,967

3 Claims. (Cl. 260—78.3)

This invention relates to synthetic polyesters and more specifically to new and unusual alpha-hydroxy acid polyesters.

Condensation products of alpha-hydroxy acids produced by self-esterification with the elimination of the water have been known for some time. One of the simplest of these is lactide, a cyclic dimer formed by heating lactic acid, i. e., alpha-hydroxypropionic acid, under reduced pressure to distill off water resulting from the condensation reaction. Higher molecular weight products, conveniently designated polylactides because the empirical formula is substantially the same as that of lactide, have been formed by heating in the range of 250° C. and up to temperatures producing considerable decomposition. Similar results have been obtained with other alpha-hydroxy acids, particularly with other alpha-hydroxycarboxylic acids, e. g., alpha-hydroxyalkanoic acids, such as glycolic acid (alpha-hydroxyacetic acid). However, such polymers previously known, particularly the polylactides, were low melting and/or brittle, incapable of being oriented by drawing, and quite unsuitable for the manufacture of fibers, filaments or self-supporting films. These polymers of the prior art found their only use in coating compositions or as modifying agents for cellulose derivatives.

Recently, as described in the copending applications of Higgins, Ser. No. 190,877, filed October 18, 1950, and Ser. No. 192,137, filed October 25, 1950, there have been discovered high molecular weight, orientable, film- and fiber-forming polyesters of hydroxyacetic acid and copolyesters thereof with other monohydroxymonocarboxylic acids and processes for obtaining such polyesters. More recently there has been discovered, as described in the copending application of Schneider, Ser. No. 230,079, filed June 5, 1951, a new class of high molecular weight orientable film- and fiber-forming polyesters of alpha-hydroxypropionic acid. However, even these improved alpha-hydroxycarboxylic acids are not as hydrolytically insensitive as is desired and for many applications their stiffness and degree of crystallinity is not as great as is desired.

This invention has as an object the provision of improved high polymers of alpha-hydroxypropionic acid. A further object is such polymers of decreased hydrolytic sensitivity and greater stiffness and crystallinity. Other objects will appear hereinafter.

These objects are accomplished by the present invention of high molecular weight, synthetic, optically active homopolyesters from, i. e., polymers whose repeating units or mers consist essentially of the same antipodal species units of, alpha-hydroxypropionic acid having their center of asymmetry in the alpha-carbon atom, which polymers are orientable, i. e., cold-drawable, to the extent of at least 200%, of $\eta_{inh.}$, at 25° C. in benzene, greater than 0.4, and exceptionally stiff, strong, and tough, especially in film or fiber form. A preferred group of these optically active homopolyesters are those of inherent viscosity greater than 0.7. These extremely high molecular weight, synthetic, optically active alpha-hydroxypropionic acid homopolyesters are easily prepared in film and fiber form by normally used film casting and wet and dry spinning techniques. They are outstandingly more hydrolytically stable and, when drawn, much more crystalline and more highly oriented and/or stiffer, higher softening, and stronger than other alpha-hydroxy acid polyesters and copolyesters, even including the previously outstanding synthetic, optically inactive, polymeric alpha-hydroxypropionic acid, i. e., polylactide.

The synthetic optically active alpha-hydroxypropionic acid homopolyesters can be prepared directly from the optically active alpha-hydroxypropionic acid itself or its ester-forming derivatives. However, to prepare the preferred tough, strong, orientable, optically active homopolyesters of this invention it has been found desirable to use the readily obtainable, easily purifiable, stable and optically active six-membered cyclic dimers of the respective alpha-hydroxypropionic acid. These dimers can be obtained simply by heating the desired optically active alpha-hydroxypropionic acid in essentially the manner of Jungfleisch and Godchot, Compt. rend., 141, 111 (1905) and 142, 637 (1906). It has been found that higher temperatures than those reported by these workers can be employed without effecting racemization.

The following examples in which the parts given are by weight illustrate further but do not limit this invention. The term inherent viscosity ($\eta_{inh.}$) used herein is defined by the following equation:

$$\eta_{inh.} = \frac{\ln . \eta_{rel.}}{C}$$

wherein ln is the natural logarithm, $$\eta_{rel.} = \frac{\eta \text{ solution}}{\eta \text{ solvent}}$$

C is the concentration of polyester in grams per 100 cc. of solution, $\eta$ in all instances representing viscosity. All viscosity results recorded in the following examples are obtained on solutions of the various polyesters dissolved in benzene at a concentration of 0.1 g. of polymer per 100 cc. of solution.

The term "tack point" is used to describe a softening temperature determined by repeatedly drawing a piece of the polymer across the face of a brass block, as the temperature of the block is slowly raised, and noting the temperature at which the polymer first softens sufficiently for a portion to adhere to the block and pull away from the rest of the polymer.

The term "orientable" is used to indicate that property of these polymers in film- or fiber-form of being drawable at temperatures of about 25–140° C. and preferably 50–70° C. into an elongated film or fiber exhibiting, by X-ray diffraction, orientation along the axis of elongation.

Unless otherwise specified, all measurements of optical rotation were carried out at 25° C. in benzene solution at 2% concentration.

*Example I—Part A*

The theoretical amount of water corresponding to concentration and dehydration was removed from 208 parts of a 45% aqueous solution of L-lactic acid by distillation over a period of two hours at 70–80° C. under a pressure corresponding to 25 mm. of Hg. The remaining concentrate was heated to 230–235° C. (pot temperature) at atmospheric pressure. When this temperature was reached, the pressure of the system was reduced to 26 mm. of Hg. Under this pressure as heating was continued, several parts of a liquid syrup distilled at 110–120° C. This product is believed to be the open chain L-lactyl-L-lactate and exhibits a very low optical rotation. As the distillation was continued, another (solid) fraction was obtained at 136–137° C. which upon condensing solidified. This solid material (25 parts—32% of theory) was recrystallized twice from a 90/10 ether/ethyl acetate mixture. There was thus obtained pure L-lactide as sharp, colorless needles melting at 95–96° C. in contrast to the more cubical mesolactide melting at 125–126° C. (See the copending application of Schneider, Ser. No. 230,079, filed June 5, 1951.) This particular sample of L-lactide exhibited an optical rotation of −280°.

Various other preparations similarly carried out varying only in that small amounts of acidic catalysts such as antimony trifluoride were added have led to somewhat improved yields of the L-lactide in the neighborhood of 50% of theory. The various L-lactide samples used in the following examples and prepared as described above have exhibited optical rotations of from −274° to −303°. The L-lactide is considerably more soluble in ether and in etheyl acetate than is the corresponding DL-lactide. Jungfleisch and Godchot, supra, report a melting point of 95° C. for L-lactide and an optical rotation of −280° in a 6% benzene solution and −298° in a 1.2% benzene solution, both at 25° C. The starting L-lactic acid employed in these preparations exhibited an optical rotation of +3.76° in a 13.2% water solution and an optical rotation of −10.2° for a 2.4% aqueous solution of the corresponding zinc salt, both at 25° C. Beilstein, Handbuch der Organischen Chemie, vol. III, p. 263 and vol. III, Zweites Erganzungswerk, p. 184, reports optical rotations of +3.82° for a 10% water solution of the acid at 15° C. and −8.2° for a 2.5% water solution of the zinc salt at 25° C.

*Example I—Part B*

A mixture of 3 parts of the L-lactide described in Example I, Part A, and about 0.01 part of litharge (0.3% based on the lactide) was placed in a polymerization reactor and the reactor then evacuated and sealed. The reactor and its contents were heated at 140–150° C. for 42 hours and then allowed to cool to room temperature. The poly-L-lactide thus obtained was a clear resin, exhibiting a tack point of 165–170° C. from which clear, strong, orientable (200% at 55° C.) films can be obtained by solvent-casting (e. g., acetone, benzene) or melt-pressing (190° C./1000 lbs./sq. in.) techniques. This example illustrates the preparation of clear, strong, optically active polymer in the lower temperature ranges. However, optically active polymers prepared in the higher temperature range such as illustrated in Example II are clearer and more soluble.

Polymer of essentially the same quality was obtained by heating a mixture of 25 parts of L-lactide, exhibiting an optical rotation of −275° and about 0.1 part (0.4%) of litharge at 160° C. for a total of 115 hours. At the end of the first 20 hours of the polymerization cycle, the melt had become viscous and at the end of the full period was nearly solid. The product was a clear, colorless sample of poly-L-lactide from which clear, strong, orientable films can be obtained by solution-casting or melt-pressing techniques.

*Example II*

A mixture of 5 parts of L-lactide (M. P. 94–95° C., optical rotation −292°) and 0.003 part of litharge (0.06% based on the L-lactide) was placed in a polymerization tube and the tube then evacuated and sealed. The tube and its contents were heated at 155° C. with the charge becoming syrupy within 3 hours and solid within 19 hours. After 115 hours at this temperature, the polymer had become opaque. The temperature was then increased to 190° C. over a period of 21 hours and held at that temperature for 2½ hours at which point the poly-L-lactide was a clear, very viscous melt. Heating was then stopped, the tube and its contents allowed to cool to room temperature, and finally the poly-L-lactide removed. The poly-L-lactide thus obtained was a hard, tough, clear resin, exhibiting a tack point of 150–165° C. and an inherent viscosity of 1.27, from which strong orientable films and fibers can be obtained by solvent or melt-casting and spinning procedures. The following table is a comparison of the properties of this poly-L-lactide with a poly-DL-lactide of equivalent viscosity prepared as described in the above copending application of Schneider.

TABLE

| Property | Polymer from— | |
|---|---|---|
| | L-lactide | DL-lactide |
| Inherent viscosity | 1.27 | 1.29 |
| Tack point °C | 160–165 | 125–130 |
| Amorphous transition temperature °C | 60–65 | 50 |
| Cold crack temp. of oriented film °C | <−50 | <−50 |
| Tensile strength (lb./sq. in.): | | |
| Dry oriented film | 29,000 | 26,000 |
| Wet oriented film | 5,400 | 3,000 |
| Break elongation, dry percent | 23 | 48 |
| Break elongation, wet do | 29 | 39 |
| Optical rotation degrees | −186 | 0 |
| Modulus in tension in lbs./in.² (A.S.T.M.-D-638-46T): Dry oriented film | 710,000 | 240,000 |

The optically active polymer exhibits markedly improved hydrolytic resistance as compared to other alpha-hydroxycarboxylic acid polyesters. For instance, polymer from L-lactide in film-form was only hydrolyzed to the extent of 6.1% after being boiled in water for 16 hours, whereas DL-lactide polymer and hydroxyacetic polymer of equivalent viscosities were hydrolyzed to the extent of 45% and 90%, respectively, under the same conditions.

*Example III*

Polymerizations carried out for 89 hours at 150–155° C., using 3% litharge catalyst based on the charged lactide in the same manner as described previously, using L-lactide, DL-lactide, and a 50/50 by weight mixture of L- and DL-lactides led to the formation of polymers with the following tack points: poly-L-lactide, 195–205° C.; poly-DL-lactide, 105–110° C.; and poly-L/DL-lactide, 100–105° C. In all instances, strong, self-supporting, orientable films could be obtained from the lactide polymers, particularly the poly-L-lactide, by solvent-casting or melt-pressing techniques.

*Example IV*

A mixture of 3 parts of L-lactide (M. P. 93–95° C. and exhibiting an optical rotation of −303°) and 0.01 part of litharge (0.3%) was heated in the manner described previously at 160° C. for 15 hours in a sealed, evacuated reactor. There was thus obtained a clear, colorless sample of poly-L-lactide, exhibiting an inherent viscosity of 0.76 and a tack point of 130° C. This poly-L-lactide was used in the preparation of clear, self-supporting, orientable films by melt-pressing (160° C./1000 lbs./sq. in.) and solvent-casting techniques. It is to be noted that poly-DL-lactide of essentially an equivalent inherent viscosity exhibits a tack point of approximately 100° C. This example illustrates the fact that even in the lower molecular weight ranges obtained by shorter heating cycles at lower temperatures, the optically active alpha-hydroxypropionic acid polymers of this invention are appreciably more outstanding in physical properties than the corresponding optically inactive ones.

*Example V*

A sample of poly-L-lactide, such as those previously described, was heated in a sublimation apparatus at a temperature of 270–275° C. under a pressure corresponding to 0.5 mm. of mercury. After heating for one hour under these conditions, the poly-L-lactide had depolymerized to L-lactide. The cooled L-lactide monomer was recrystallized once from diethyl ether and found to melt at 94–95° C., to exhibit an optical rotation of −283°, and to exhibit no depression in a mixed melting point with an authentic sample of freshly prepared L-lactide. This example demonstrates that the optically active alpha-hydroxypropionic acid polyesters of this invention are truly optically active and that no racemization has taken place during the polymerization stages.

This invention is generic to the homopolymers from, i. e., the polymers from single antipodal species of optically active alpha-hydroxypropionic acid. These new optically active alpha-hydroxypropionic acid homopolymers are orientable, i. e., cold-drawable, to the extent of at least 200% and in benzene solution at a concentration of 0.1 g. per 100 cc. of solution at 25° C. exhibit inherent viscosities greater than 0.4 and preferably greater than 0.7. These new optically active homopolyesters are exceptionally strong and tough in film- or fiberform as well as much stiffer (drawn) and vastly more hydrolytically resistant than the corresponding optically inactive alpha-hydroxypropionic acid homopolyesters (see Example II).

These optically active alpha-hydroxypropionic acid homopolyesters can be formed into tough, strong films or fibers by conventionally used solution or melt-casting, pressing, and spinning techniques. Convenient solvents for the solvent-casting or spinning procedures include the aliphatic and cycloaliphatic ketones, preferably the lower saturated aliphatic ketones, e. g., acetone, methyl ethyl ketone, and the liquid aromatic hydrocarbons, e. g., benzene and toluene. The polymers are insoluble in water and alcohols such as methyl and ethyl alcohol, and exhibit a comparatively high insensitivity to hydrolysis. These polyesters will normally exhibit tack points in the range 130°–210° C. with the best overall polymers having tack points in the range 150–180° C. depending upon the degree of polymerization. Temperatures in the range 140°–200° C. and preferably 160–180° C. are used for melt-spinning or melt-pressing of films and fibers. Because of a tendency for the high molecular weight homopolyesters to depolymerize appreciably at temperatures in excess of 220° C. (see Example V), such temperatures should be avoided in any melt-spinning or melt-pressing procedures except possibly for very short periods of time.

These high molecular weight synthetic, orientable, optically active alpha-hydroxypropionic acid homopolyesters can be prepared directly by thermal condensation of the optically active six-membered cyclic condensation dimers of the respective optically active alpha-hydroxypropionic acid. These dimers, as illustrated by Example I, can be obtained simply by heating the requisite optically active alpha-hydroxypropionic acid for relatively short periods of time at relatively high temperatures, e. g., 220–250° C. and subsequently distilling at reduced pressure. These stable cyclic dimers are formed by the condensation between two moles of the alpha-hydroxypropionic acid with liberation of two moles of water and thus are condensation-type dimers rather than addition-type dimers. They are represented structurally by the following formula:

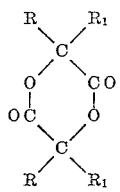

wherein R and R₁ must be different and can be hydrogen or methyl. These cyclic dimers are thus properly described as C-methyl glycolides. They are crystalline compounds readily purifiable by recrystallization from conventional organic solvents, such as, the saturated aliphatic alcohols, preferably the lower saturated aliphatic alcohols of no more than four to six carbons, e. g., methanol, ethanol, butanol; the lower saturated aliphatic hydrocarbon esters of the lower saturated aliphatic monocarboxylic acids, e. g., ethyl acetate; or the liquid hydrocarbon ethers, e. g., diethyl ether; or mixtures thereof. Because of the readier polymerization to the higher molecular weight more desirable optically active homopolyesters of this invention, it is preferred to use the purified cyclic dimers in the thermal condensation step.

The polymerization is carried out by heating the purified dimers at temperatures from just above the melting point up to about 220° C. with a preferred temperature ranging from 140–190° C. While optically active alpha-hydroxypropionic acid homopolyesters can be obtained by polymerizing at lower temperatures, for instance, in the range of 80–120° C. by heating a solution of the requisite crystalline purified dimer in a solvent such as benzene or xylene, the resulting optically active polyesters obtained have, in general, lower inherent viscosities and are not capable of being oriented. Acceptable orientable optically active homopolyesters can be obtained by direct bulk polymerization of the purified crystalline dimers in the lower temperature range, i. e., from the melting point up to about 120° C. However, again these optically active homopolyesters are in general not of sufficiently high molecular weight to be capable of forming the most desirable, orientable, tough, strong polyesters. Accordingly, the preferred polymerization procedure involves heating the purified crystalline dimers in bulk in the range 140–190° C. Good quality polymer can be obtained in this process in the lower temperature portion of the indicated range. However, to obtain the most satisfactory, strongest and most readily orientable polyesters, it is preferred to carry the polymerization state to the higher portion of the indicated temperature range, e. g., 180–190° C. The optically active homopolyesters thereby obtained are generally clearer and more soluble than those obtained in the lower ranges, and in addition form stronger, tougher and more readily orientable polymers.

Because better quality polymers are generally obtained, it is preferred to carry out the thermal condensation step in a closer, evacuated reaction vessel. However, orientable optically active homopolyesters can be obtained by carrying out the polymerization step at atmospheric pressure with the system blanketed by an inert gas, such as, for example, nitrogen. The time of polymerization is dependent upon the temperature being used, with more rapid polymerization taking place at the higher temperatures. Generally, a longer polymerization cycle results in the formation of optically active homopolyesters of higher inherent viscosities capable of forming stronger and tougher films and fibers. In general, the polymerization will be carried out for about 10–15 hours although longer times, e. g., 40 to 100–120 hours are preferred for the formation of the most desirable polymers. As is true of all polymer-forming reactions, there is no limit to the time of polymerization. However, for reasons of operating time and efficiency, it is generally undesirable to carry out the polymerization for periods much longer than about 120 hours.

It is quite essential in order to obtain the high molecular weight orientable optically active homopolyesters of this invention exhibiting inherent viscosities greater than 0.4 and preferably greater than 0.7 to use highly purified intermediates. This includes using purified starting acids exhibiting the highest possible optical rotation and in the preferred route involving the intermediate cyclic dimers using such cyclic dimers which have been purified by repeated recrystallization and exhibit the highest rotation. Generally, the desired level of purity in the preferred process can be obtained by using cyclic crystalline dimers which have been recrystallized at least once and preferably two or more times with the last recrystallization preferably being carried out just prior to polymerization. The degree of purity of the intermediate dimers will be indicated by the melting point and the relative magnitude of the optical rotation exhibited thereby. For instance, in the case of the preparation of high molecular weight synthetic, orientable, D- or L-alpha-hydroxypropionic acid homopolyesters satisfactory criteria of purity of the intermediate cyclic dimers include a melting point of 94–96° C. and an optical rotation of, respectively, at least +260° and −260°, and preferably at least +280° and −280°.

In carrying out the thermal polymerization of the cyclic dimer intermediates, it is preferred to use as a polymerization catalyst, one or more of the class of esterinterchange catalysts. The examples have illustrated the use of litharge in this step. However, other oxides of polyvalent metals, either added as such or as salts of these metals, which are thermally converted to the oxide under the polymerization conditions are operable. Specific examples of other such oxides and salts include lead stearate, basic lead carbonate, antimony trioxide, zinc oxide, zinc borate, cadmium oxide, titanyl stearate, magnesium oxide, calcium formate, and the like. The oxides and salts of the heavy metals are preferred. Lead oxides and lead salts are especially suitable because of their high activity in producing optically active alpha-hydroxypropionic acid homopolyesters of high inherent viscosities. These catalysts are normally used in concentrations of from 0.01% to 0.4% and preferably 0.02% to 0.1% of the weight of the charged cycle imers. Higher concentrations can be used but are less desirable since they generally cause the creation of more color in the polymer.

The optically active alpha-hydroxypropionic acid homopolyesters of this invention are readily capable of being oriented at relatively low temperatures ranging from 25° C. to 75° C. or higher. In the lower temperature ranges, 25° C. to 40° C., the orienting step is somewhat difficult and frequently leads to broken films or fibers. Temperatures above 75° C., e. g., of the order of 100° C.–120° C. can be used but no advantage is gained thereby and problems due to plastic flow in the polymers are frequently encountered. Accordingly, it is preferred to orient the polymers of this invention in film- or fiber-form at temperatures in the range 40–70° C. These temperatures can be conveniently obtained in the drawing stage by passing the film or fiber through a heat transfer bath maintained at the desired temperature. For reasons of cost and convenience coupled with the high hydrolytic resistance exhibited by these optically active homopolyesters, it is normally convenient to use a water-bath at the desired temperature during this stage of the process. The optically active homopolyesters as oriented in film- or fiber-form are appreciably tougher and stronger than the same polymers in unoriented form. These oriented optically active homopolyesters as evidenced by X-ray diffraction patterns exhibit an extremely high order of crystallinity and close packing with extreme linearity and orientation in the direction of elongation. These oriented polymers are much more crystalline, more highly oriented, and more closely packed in molecular structure than the corresponding oriented optically inactive homopolyesters.

It is important to note that only one antipodal species of alpha-hydroxypropionic acid can be present in each of the optically active homopolyesters of this invention, i. e., that the homopolyesters are those prepared from only one optically active species. For instance, although a polymer from a 60/40 by weight mixture of D- and L-alpha-hydroxypropionic acids might be considered an optically active alpha-hydroxypropionic acid homopolyester, such polymers are not included in the present invention and, in fact, do not exhibit the outstanding properties of strength, toughness, and orientability of the polymers prepared from a single antipodal species of the alpha-hydroxypropionic acid.

Thus, the polymers of this invention are the high molecular weight synthetic, orientable, optically active alpha-hydroxypropionic acid homopolyesters. The polymers furthermore are comprised of only one antipodal species of such acid. These polymers are preferably prepared by the thermal condensation in a closed evacuated reactor of freshly purified crystalline cyclic dimer of the requisite alpha-hydroxypropionic acid involved by heating at temperatures from 140–190° C. for periods of time ranging from 40 to 115 hours in the presence of from 0.01 to 0.4% and preferably 0.02 to 0.10% of an oxide or salt of the heavy metals as catalyst.

The high molecular weight, synthetic, optically active alpha-hydroxypropionic acid homopolyesters of this invention, particularly in oriented form are especially valuable in such applications as the manufacture of fibers and self-supporting films and for plastics. Because of their optical activity and their ability to be cast and molded, the polymers of the present invention are of particular utility in the formation of lens, filters, prisms and other elements for use in optical instruments and other such devices where their rotative effect on light beams can be used. They are also useful in the manufacture of adhesives, safety glass, finishes, and to a minor extent, in blends with other polymers for these purposes. Their ability to be oriented to extremely high degrees by drawing enables the development of high strength and stiffness in the oriented polymer, appreciably greater than those of the corresponding oriented, optically inactive polymers. Furthermore, the good properties of the polymers are retained at low temperatures and under conditions of high humidity and even on direct immersion in water, representing marked improvements, particularly in hydrolytic resistance, over the prior known polymers of other alpha-hydroxycarboxylic acids, even over those of the previously outstanding optically inactive alpha-hydroxycarboxylic acid polymers as described in greater detail in the copending application of Schneider, supra.

The foregoing detailed description has been given for clearness of understanding only and no unnecessary limitations are to be understood therefrom. The invention is not limited to the exact details shown and described for obvious modifications will occur to those skilled in the art.

What is claimed is:

1. Process for the preparation of a high molecular weight, optically active polymer, cold-drawable to the extent of at least 200%, of inherent viscosity at 25° C. in benzene of at least 0.4, whose repeating units consist of one antipodal species of alpha-hydroxypropionic acid, which comprises heating, in the presence of a polyvalent metal oxide ester interchange catalyst, the cyclic dimer of said antipodal species of said acid of melting point of at least 94° C. and optical rotation of at least 260°, in the molten state at a temperature of 120° C. up to about 220° C. for at least 15 hours.

2. Process of claim 1 wherein the dimer is heated with litharge.

3. An optically active polymer, cold-drawable to the extent of at least 200%, of inherent viscosity at 25° C. in benzene of at least 0.4, whose repeating units consist of one antipodal species of alpha-hydroxypropionic acid.

References Cited in the file of this patent

UNITED STATES PATENTS

| | | |
|---|---|---|
| 1,095,205 | Gruter | May 5, 1914 |
| 1,995,970 | Dorough | May 26, 1935 |
| 2,144,352 | Watson | Jan. 17, 1939 |
| 2,471,023 | Cook et al. | May 24, 1949 |
| 2,585,427 | Beck | Feb. 12, 1952 |

FOREIGN PATENTS

| | | |
|---|---|---|
| 550,837 | Great Britain | Jan. 27, 1943 |

OTHER REFERENCES

Fieser et al., Organic Chemistry, pp. 257 and 494, 2nd Edition, 1950, Heath Co., New York.

Groggins, Unit Processes in Organic Synthesis, 3rd Edition, 1947, McGraw Hill, New York, pp. 624–7.

Watson, "Lactic Acid Polymers," Ind. Eng. Chem., 40, 1393–1397.